W. A. McCOOL.
TYPE WRITER.
APPLICATION FILED JUNE 19, 1903.
964,045.
Patented July 12, 1910.
7 SHEETS—SHEET 1.
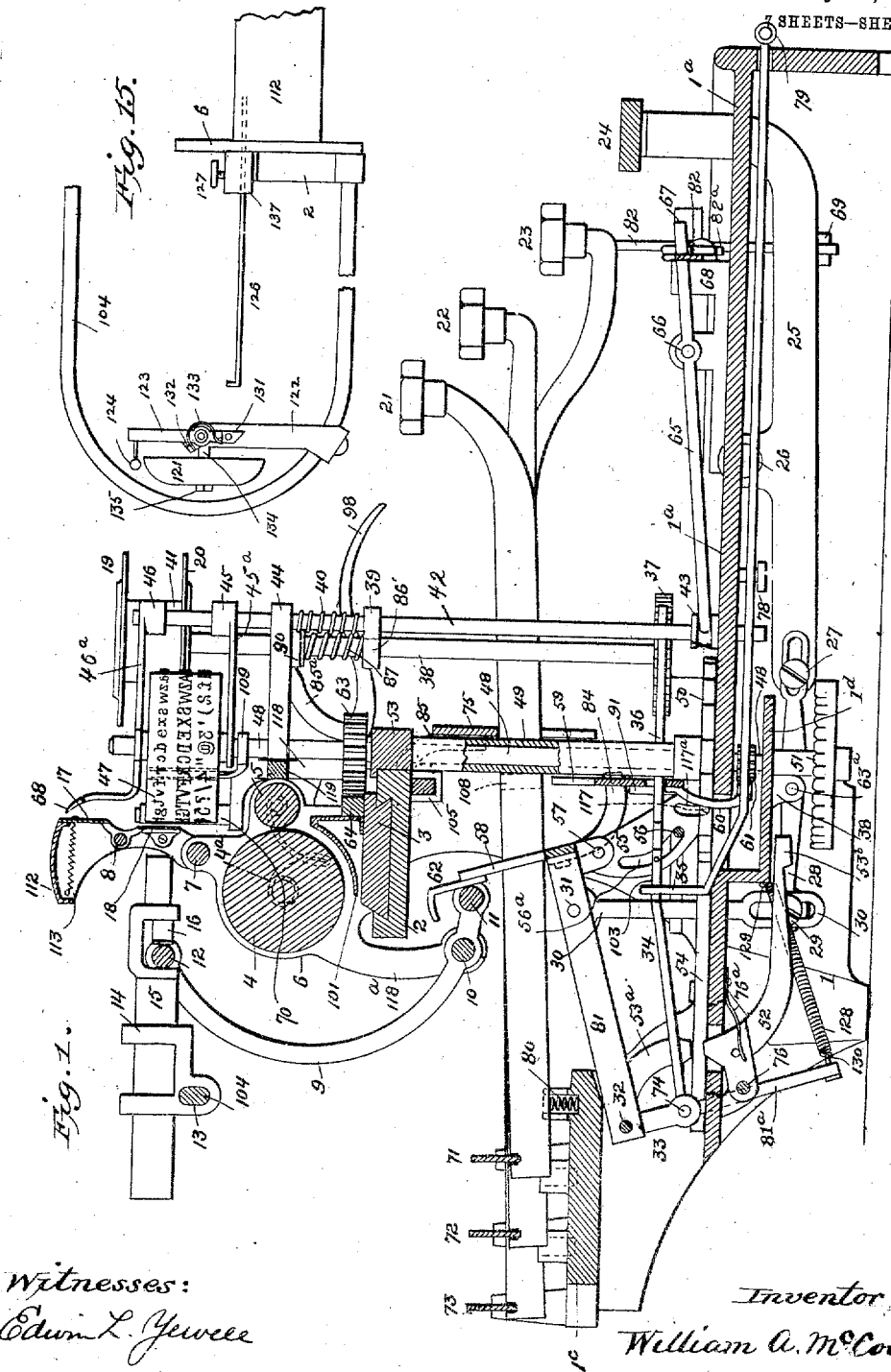
Witnesses:
Edwin L. Jewell
Edwin P. Rea.
Inventor:
William A. McCool
H. H. Bliss
atty.

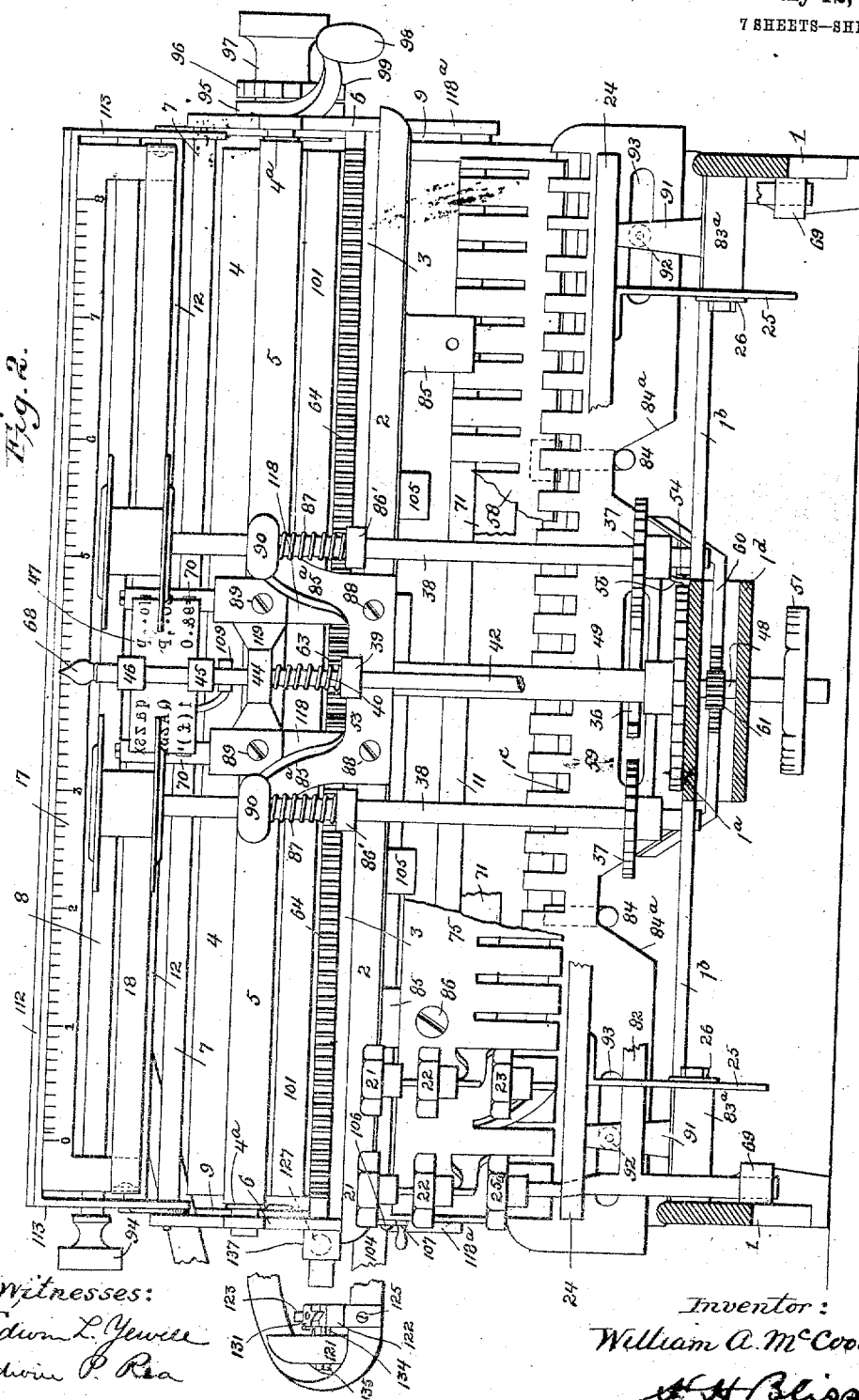

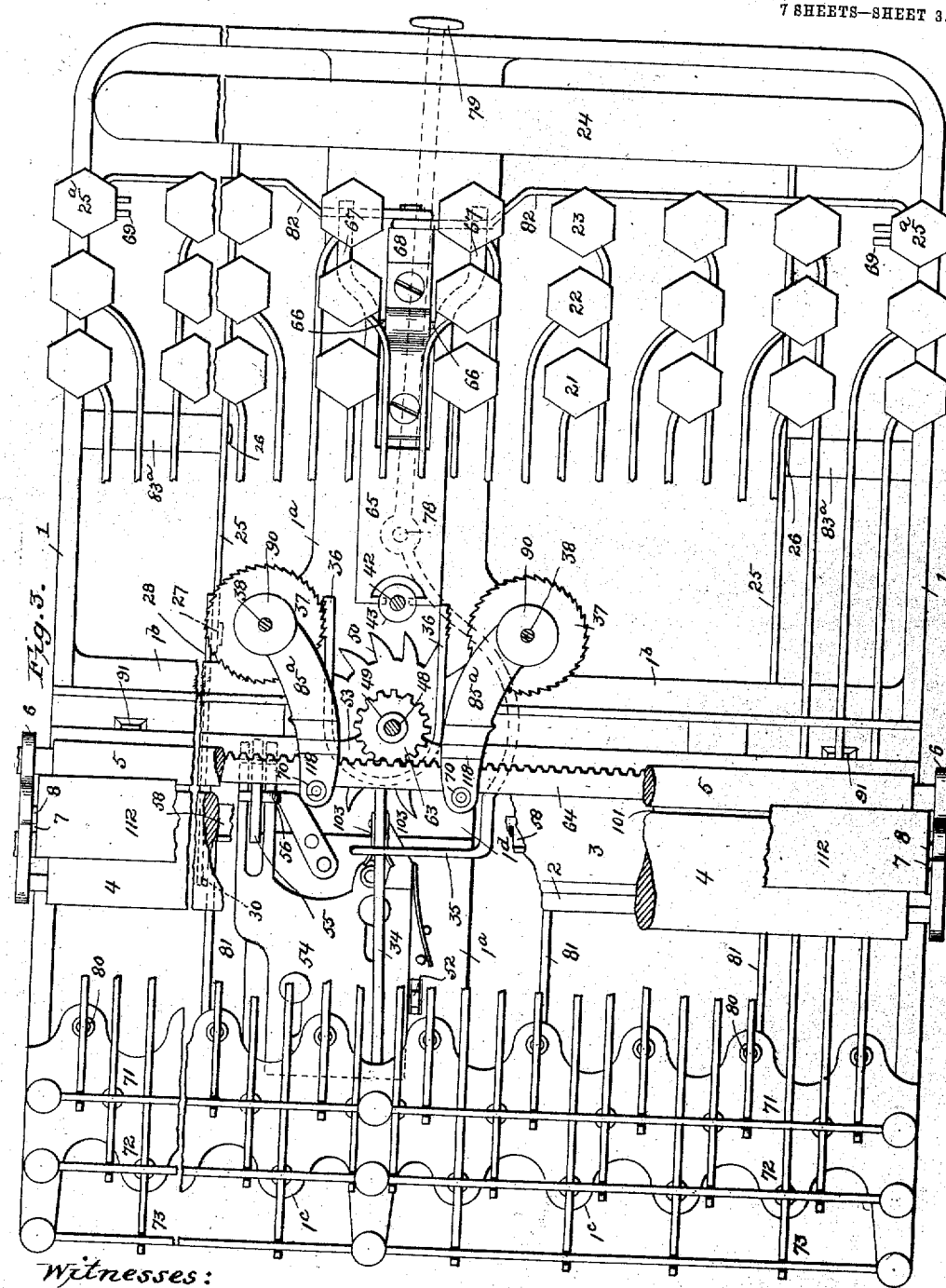

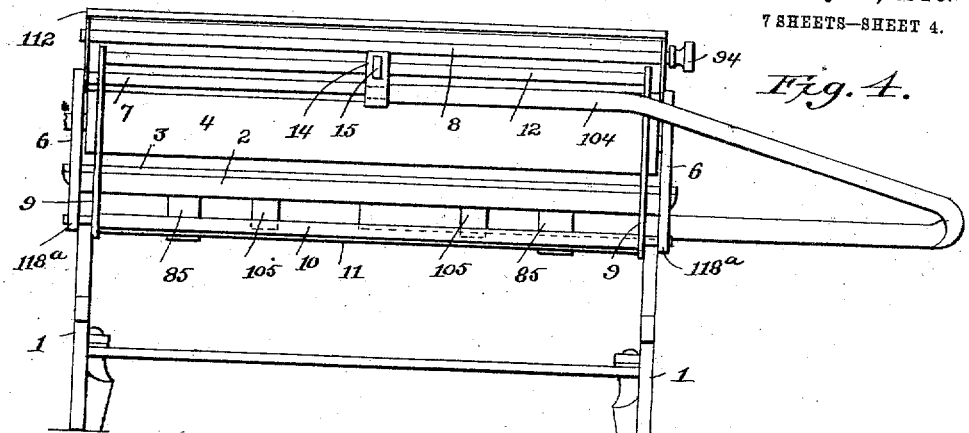
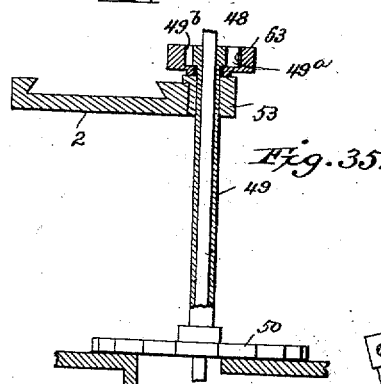
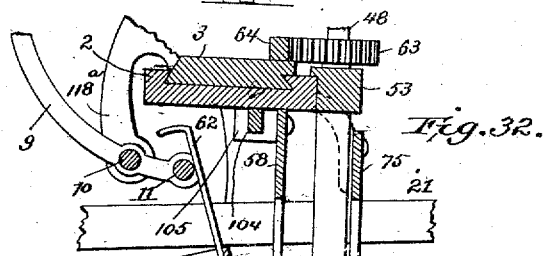
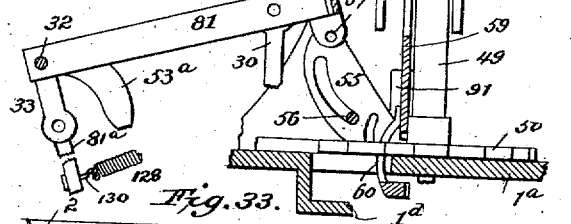
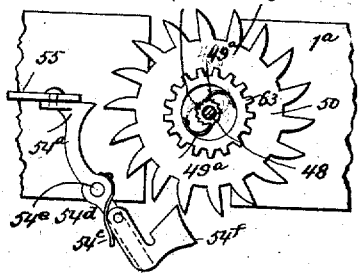
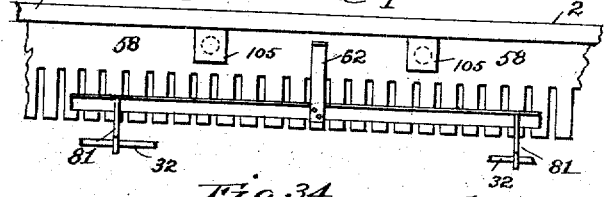
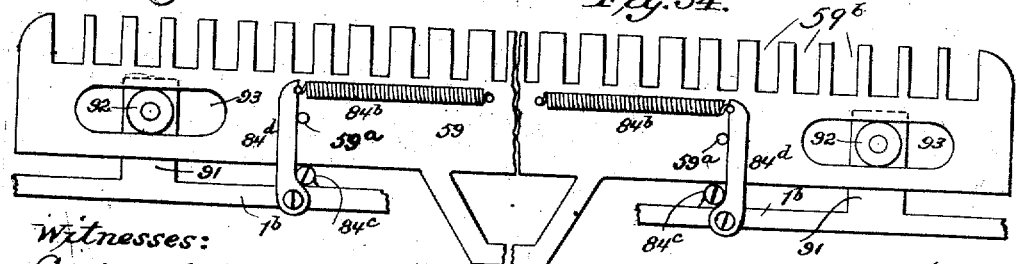

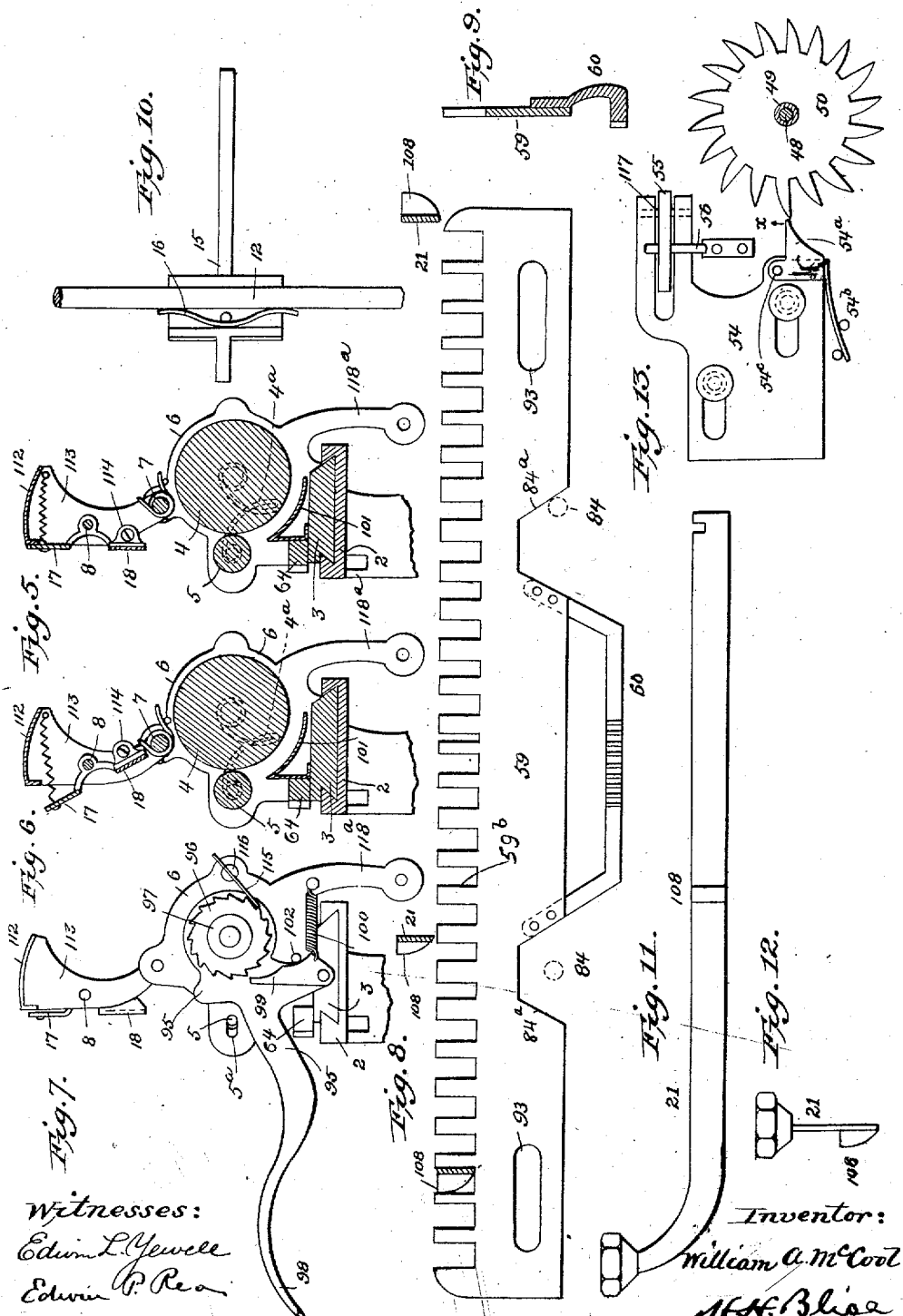

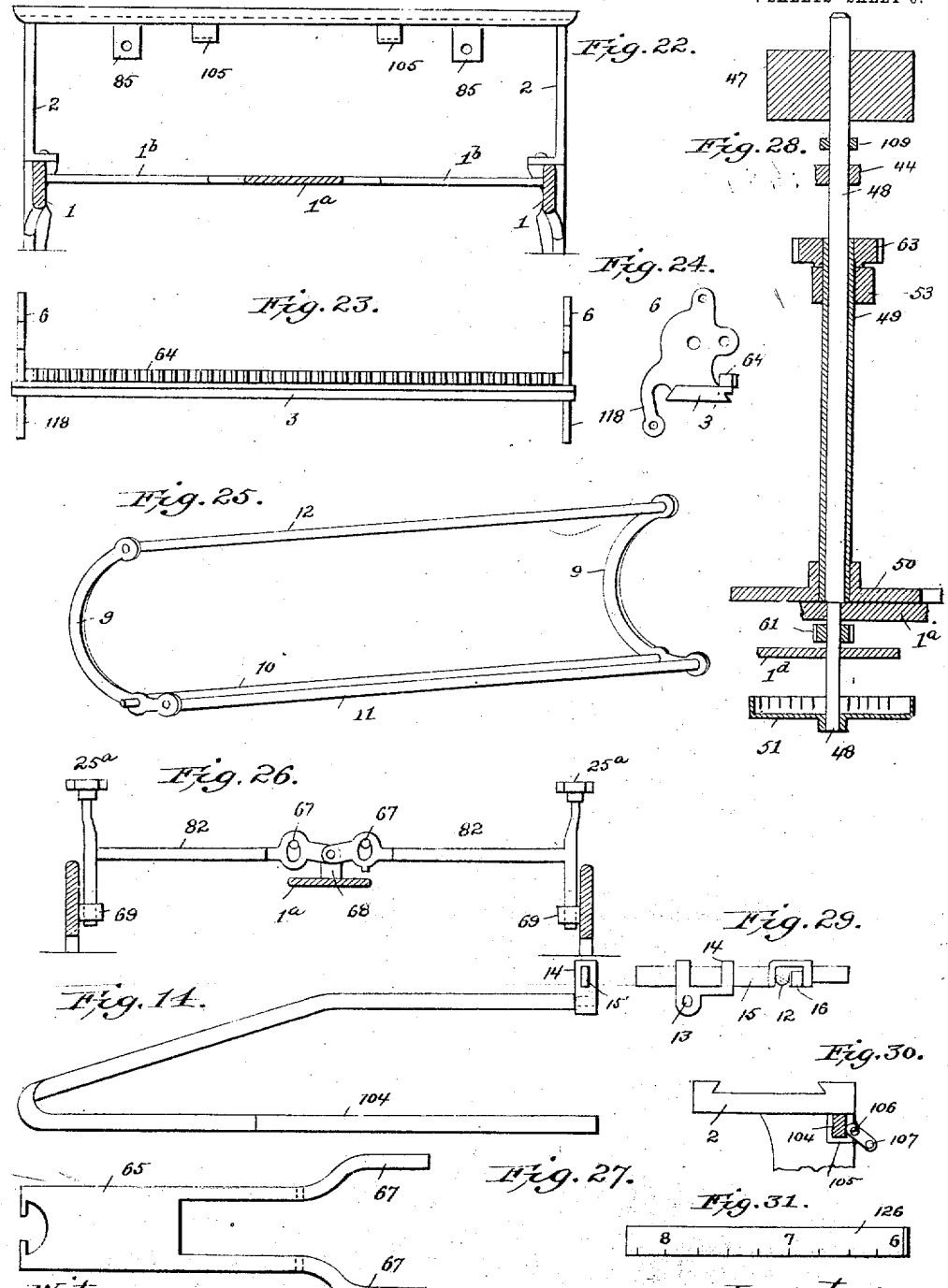

W. A. McCOOL.
TYPE WRITER.
APPLICATION FILED JUNE 19, 1903.
964,045.
Patented July 12, 1910.
7 SHEETS—SHEET 7.
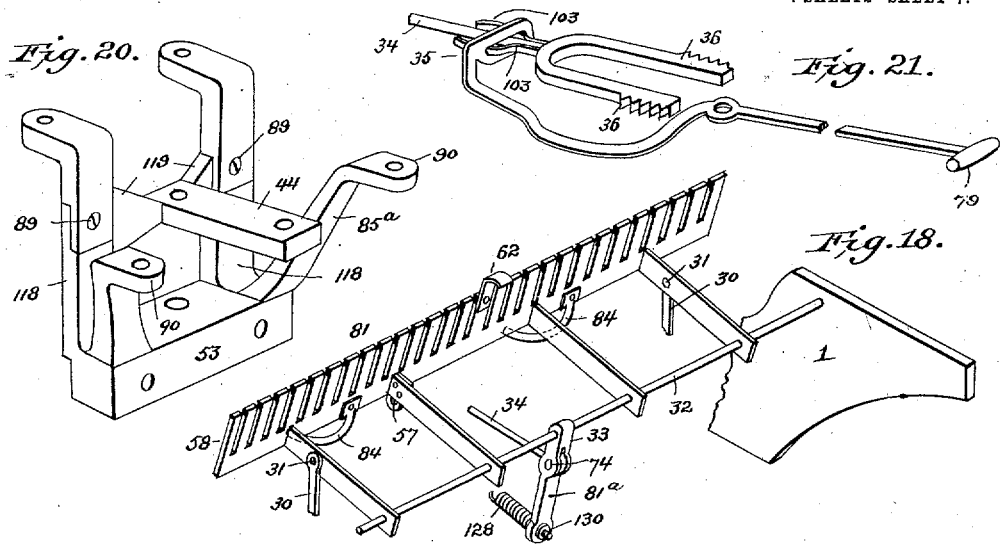
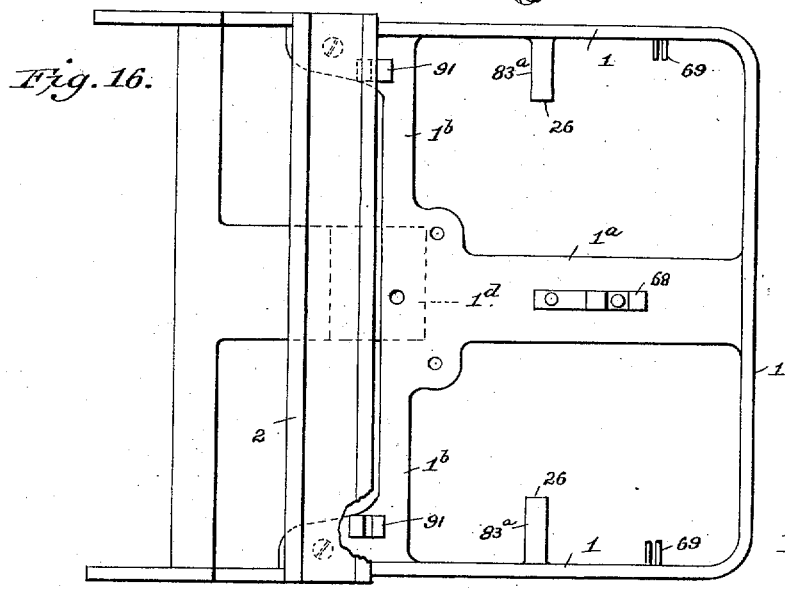
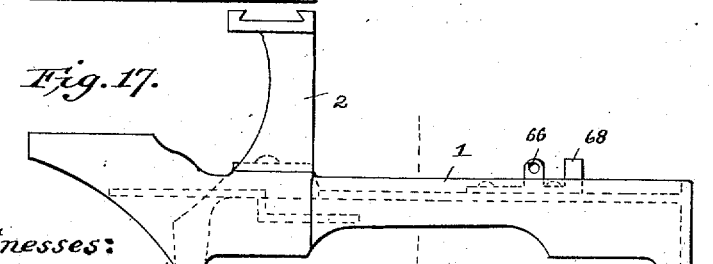
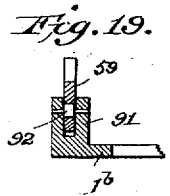
Witnesses:
Edwin L. Yewell
Edwin P. Rea
Inventor:
William A. McCool
H. H. Bliss

UNITED STATES PATENT OFFICE.

WILLIAM A. McCOOL, OF BEAVER FALLS, PENNSYLVANIA, ASSIGNOR TO ACME-KEYSTONE MANUFACTURING COMPANY, A CORPORATION OF PENNSYLVANIA.

TYPE-WRITER.

964,045.

Specification of Letters Patent. Patented July 12, 1910.

Application filed June 19, 1903. Serial No. 162,225.

*To all whom it may concern:*

Be it known that I, WILLIAM A. McCOOL, a citizen of the United States, residing at Beaver Falls, in the county of Beaver and State of Pennsylvania, have invented certain new and useful Improvements in Type-Writers, of which the following is a specification, reference being had therein to the accompanying drawing.

My invention relates to typewriters, and more especially to machines of the type-wheel class, its object being to provide a compact and simple form of such machine in which the number of parts are greatly reduced, while at the same time the mechanism is of such simple and durable form as not to get out of order, making it possible to build a rapid working machine at a comparatively low cost.

To these ends my invention comprises the novel features of construction hereinafter fully set forth and claimed.

Referring to the drawings Figure 1 is a vertical longitudinal sectional view of a machine embodying my invention; Fig. 2 is a partial transverse elevation and section of the same; Fig. 3 is a top plan view with the carriage and keys broken away to show the actuating elements; Fig. 4 is an elevation upon a smaller scale from the rear of the machine showing the hammer support, the main frame and some of the other parts; Fig. 5 is a vertical transverse section of the paper carriage showing the paper holder closed; Fig. 6 is a similar section showing the paper holder open; Fig. 7 is an end elevation of the paper carriage; Fig. 8 is a view of the type-wheel setting bar; Fig. 9 is a vertical section of the parts in Fig. 8; Fig. 10 is a bottom plan of the impression hammer; Fig. 11 is a detached view of the key lever and the type setting block; Fig. 12 is an end view of a key lever; Fig. 13 is a plan view of parts of the train of devices for moving the paper carriage; Fig. 14 is an end view of the hammer and a front view of its support detached; Fig. 15 is a plan view showing the bell to indicate the limit of carriage travel; Fig. 16 is a plan view on a smaller scale of the bed frame, or main frame; Fig. 17 is an end elevation of the same; Fig. 18 is a perspective of the swinging frame actuated by the keys for transmitting power to other parts of the mechanism; Fig. 19 is a section showing on a smaller scale the type setting bar in Fig. 8, and its guides and roller support; Fig. 20 is a perspective of the main central bracket for supporting the type wheel shaft and adjacent parts; Fig. 21 is a perspective of the ratchet which actuates the ribbon and their manual adjusting devices; Fig. 22 is a cross sectional view on a smaller scale of the main frame shown in Fig. 1 and others; Fig. 23 is a front view of the paper carriage frame and its rack; Fig. 24 is an end view of the same; Fig. 25 is a perspective of the swinging devices for actuating the hammer; Fig. 26 shows detached the keys and levers for shifting the type-wheel vertically; Fig. 27 is a plan of the clutch bar for shifting the type-wheel vertically; Fig. 28 is a vertical section showing the type-wheel shaft and parts mounted thereon; Fig. 29 illustrates the hammer in side view shown in Fig. 10; Fig. 30 is a detail view of the lock for securing the hammer support in position; Fig. 31 is a view of the strike bar; Fig. 32 is a sectional view showing some of the carriage advancing parts and other parts; Fig. 33 is a rear view showing detached part of the framework and of the rocking frame; Fig. 34 shows a modification of the device for returning to normal position the slotted plate which sets the type carrier; Figs. 35 and 36 illustrate a modification of the carriage movement.

In the accompanying drawings 1 designates a frame made of any suitable material substantially rectangular in form and has formed integral therewith, or suitably attached thereto, slightly below its upper surface a longitudinal brace 1ª and a transverse brace 1ᵇ. Above such braces and at the rear of the frame is the transverse key seat 1ᶜ. Mounted transversely of the frame about midway of its length is a bridge 2, which is milled out or otherwise shaped to form guide-ways for the paper carriage 3 which is adapted to move longitudinally on the bridge 2 transversely of the frame 1.

*Key mechanism.*—The key levers 21, 22 and 23 are preferably arranged in banks in the ordinary manner, said levers being provided at their outer ends with knobs or buttons carrying letters corresponding to the letters of the type wheel. A toothed type wheel setting bar 59 is adapted to move transversely of the machine in slotted guides 91 extending up from the transverse brace 1ᵇ in front of the bridge 2, said toothed bar resting upon the rollers 92, which engage longitudinal slots 93 in said bar 59. In this manner the toothed bar 59 is in position to be readily moved to one side or the other according to the key lever depressed and its movement accurately determined, all as fully hereinafter set forth. This toothed bar 59 is situated at approximately the longitudinal centers of the key levers 21, 22 and 23, which are fulcrumed upon the key seat on three different lines. The fulcrum of the upper or shortest key levers 21 is at 71, that of the intermediate key levers 22 at 72, and that of the longest key levers 23 at 73. The purpose of this arrangement of the fulcrum points of the key levers is to have the distance from the toothed bar 59 to the key lever fulcrum equal to the distance from the bar 59 to the outer end or striking point of each of the key levers. The leverage of all the keys is thus made uniform and the pressure, or touch, required for operation is the same for all levers.

Each key lever is provided with a spiral spring 80 fitted within a pocket in the key seat 1$^c$ and supporting the key lever at a point between its fulcrum and the toothed bar 59. In this way uniformity of "touch" and of movement is obtained, for at the point where the key levers engage the toothed bar 59 the amount of depression is the same for all the keys, and as all are equi-levers the total depression of all the keys and the energy required for such depression are the same in all.

On one side of each key lever at substantially the mid point of said lever is a curved or inclined lug or strike block 108, (Figs. 8, 11 and 12), the key levers upon the right side of the longitudinal center of the machine respectively having their strike blocks upon the right sides, and those on the left side of said central plane having their strike blocks upon the left sides. The strike blocks 108 have their curved or inclined operative edges varying in width in order that they may impart a greater or less movement to the toothed bar 59, and accordingly the intermediate spaces of said bar vary to correspond substantially with the width of said blocks.

*Type-wheel mechanism.*—As above stated the setting bar 59 rests normally in place on the rollers 92 in the guides 91 and is retained in its central or normal position by the guide arms 84 which are attached to a rocking frame 81 and extend forwardly and impinge against two oppositely inclined faces 84$^a$ in the lower edge of the bar 59. When the rocking frame returns to its normal position it will cause the guide arms 84 to move in contact with the inclined faces 84$^a$ and so act to return the bar 59 to its normal position. The frame 81 is rocked on the depression of each and every key lever and spacing bar. The number of teeth and of recesses 59$^b$ in the upper edge of the bar 59 corresponds to the number of keys intended to operate therewith, and one vertical side of each recess coincides with and rests immediately below the narrow portion of the strike block 108 on the key lever with which it coöperates, so that when the strike block descends its curved face will engage the upper edge of the tooth and gradually move the bar 59 longitudinally in one direction or the other. The recesses 59$^b$ are practically rectangular in form and are all of substantially uniform depth and when a key is depressed the key lever and its strike block 108 fill the corresponding recess and prevent endwise or lateral movement of the toothed bar 59, its rack 60 and the type wheel 47 during the latter portion of the stroke.

As it is essential that the type-wheel which is rotated by the movement of the toothed bar 59 shall be turned on its axis just sufficiently to bring the desired character on its periphery to proper alinement with the paper on the carriage, each strike block 108 has its greatest horizontal diameter or width equal to the distance which it is required to move the toothed bar 59 to bring such character to the proper position. And as it is requisite in the cycle of movement caused by each depression of a key that the work effected by the first portion of the stroke shall be accomplished, and the members actuated by that portion of the stroke brought to rest before certain other operations ensue, these strike blocks are curved outwardly from the bottom of the key lever more or less, each to a point answering to substantially two-thirds the fixed distance through which the key lever travels at its point of engagement with the toothed bar 59. The outer edge of the block is parallel with the key lever from that point upward. By this construction after the curved or inclined portion of the strike block has passed beyond the upper edge of the tooth of the bar 59 with which it engages, the further movement of the key lever has no further effect so far as the movement of the bar 59 is concerned. This further movement of the key lever, however, acts to operate other parts of the mechanism, all as hereinafter fully set forth.

Centrally attached to the lower edge of the toothed bar 59 is a horizontal rack 60, which may be formed integral with the bar 59 or suitably secured thereto. Upon the bridge 2 midway of its length is a bracket 53 which forms a bearing for a gear wheel 63 secured to a sleeve 49, and upon the lower end of said sleeve is secured a ratchet wheel 50 which is adapted to move the paper carriage 3. This ratchet wheel 50 has teeth cut with radial faces in the direction of its rotation and formed with curved working faces upon their opposite sides. This ratchet wheel 50 is so correlated to the gear wheel 63 upon the sleeve 49 that its revolution by one tooth moves the superposed carriage 3 one type space.

Extending through the sleeve 49 is a vertical shaft 48, which is journaled in a bracket arm 44. On the upper end of said shaft is fitted a type wheel 47 adapted to have free vertical movement thereon. Upon the shaft 48 is also secured the collar 109 with an arm 109$^a$ which is curved upwardly and enters an opening in the type wheel 47. This arm maintains the type wheel 47 in fixed axial relation with the shaft 48 whether in its normal position or raised thereon, as fully hereinafter set forth.

Between the cross brace 1$^a$ and a depending shelf 1$^d$ a pinion 61 is secured to the lower end of shaft 48, which pinion 61 meshes with the rack 60 upon the bar 59. The depression of any key causes the reciprocation of the toothed bar 59 and the rotation of the type wheel 47 to bring the required letter into printing alinement with the paper on the carriage.

*Carriage feed mechanism.*—Attached to the lugs 85 at the front of the bridge 2 by screws 86 is a key lever guide 75 slitted for the free admission of the key levers to guide them in relation to the toothed bar 59 so as to keep the key levers from wabbling and holding them in accurate alinement with the toothed bar 59. At the rear of the frame 1 and below the seat 1$^c$ is a rocking frame 81 which is hinged transversely by means of a pivoted bar 32. The rocking frame 81 is provided at its forward end with a key-lever-guide 58 which, like the key-lever-guide 75, is slitted for the reception of the key levers which rest normally upon the bottom of the slits, said slits being in accurate alinement with slits of the guide 75. By this construction the key levers are held in guides both in front and in the rear of the toothed bar 59 which insures said bars being held in proper position with reference to said bar 59 so as to give great accuracy of movement to said bar. The rocking frame 81 is normally spring supported by the spring 128 which is held by a hook 129 on the shelf 1$^d$ and its tension is adjustable by the screw hook 130 which connects the spring 128 to said rocking frame (Fig. 18). The depression of any key lever depresses the rocking frame 81 to a uniform distance.

The carriage 3 is fitted to travel in the guide-ways on the bridge 2. A driving pawl 54 is mounted to slide in suitable guides upon the brace 1$^a$ in the rear of the ratchet wheel 50, (Figs. 3 and 13.) This driving pawl 54 has a concaved faced tooth 54$^a$ adapted to engage with the convexly curved faces of the teeth on the wheel 50, so that by each forward movement of the driving pawl the tooth 54$^a$ will act to drive the ratchet wheel the space of one tooth.

Secured to the brace 1$^a$ or to the frame of the machine if desired, is a pin 56 at right angles with the line of travel of the pawl 54, said pin passing through a hyperbolic curved slot 56$^a$ in a toggle link 55. A fixed pin 117 upon the pawl 54 passes through a short curved slot 117$^a$ near to and in front of the hyperbolic curved slot 56$^a$. In this manner the toggle link 55 is connected with the pawl 54 while the pin or pivot 57 connects the link 55 flexibly with the rocking frame 81. The relation of the curved slot 56$^a$ in the link 55 and the pivoted connection 57 with the rocking member 81 is such that the total forward travel of the link 55 on its guide pin 56 during the movement of the pawl is accomplished during two thirds of the downward swing of the rocking frame 81, and the remainder of the curved slot slides downwardly upon its guide pin 56. Greater or lesser lengths of stroke may be obtained by changing the relation of the focus of the curves to the pivotal connection 57 which connects the toggle link 55 with the rocking frame 81. When said rocking frame 81 is depressed the link 55 is driven forward on its guide pin 56 and through its connection with the pawl 54 by means of the pin 117 forces the pawl 54 into engagement with the convex face of one of the teeth of the ratchet wheel 50 and causes said wheel to rotate the pitch distance of one tooth. As the gear wheel 63 is mounted on the same sleeve as the ratchet wheel 50 and meshes with the rack 64 on the carriage 3, said carriage is positively moved the requisite distance to provide for the spacing between the letters. The carriage 3 has no retracting spring but simply rests upon the bridge, being dependent upon gravity for its stability. The rack 64 and gear wheel 63 move it positively in one direction when the keys are depressed, and as the ratchet wheel 50 and sleeve 49 are free the carriage may be moved by hand in either direction at the will of the operator.

*Spacing mechanism.*—To accomplish the spacing of any document or the placing of the carriage at a given point without the depression of any of the character keys the spacing bar 24 is mounted upon oppositely placed curved arms 25 pivoted at 26 upon opposite sides of the frame 1. One arm is loosely connected at its rear end by the screw 27 to a horizontal lever 28 supported on a pivot 63$^a$ in a stud 38, which horizontal lever 28 is in turn connected with a vertical link 30 by means of the screw 29. The link 30 is pivoted to the rocking frame 81 independently of the keys and actuates the link 55 and the ratchet wheel 50, causing the carriage to move as required without actuating the toothed bar 59 to set the type wheel. The screw 26 fits in a slot in the link 30, so that when the frame 81 is rocked by the key levers no movement will be transmitted to the lever 28 and spacing bar 24.

*Type wheel locking mechanism.*—In order to lock the type-wheel positively at the point to which is has been turned by the operation of one of the key levers and insure its being held in this position during the printing operation, I provide the following locking mechanism: The shaft 48 with which the type wheel 47 is rotated extends below its rotating pinion 61 and upon its lower end and below the shelf $1^d$ of the brace $1^a$ there is secured a crown wheel 51 which is spaced into thirty-four peripheral spaces to correspond with the vertical character spaces of the type-wheel 47. Twenty-eight spaces in the crown wheel are slotted or cut and the remainder of the periphery is left blank to correspond with the blank portion of the type wheel 47 which carries no type. Upon the pivot 76 on the frame $1^a$ a lever 52 is supported and extends forwardly to a point above the teeth of the crown wheel 51 where it is provided with a knife edge $53^b$ adapted to fit the space between two of the teeth of the wheel 51. This lever is held normally out of engagement with the crown wheel 51 by a spring $76^a$. An arm $53^a$ is attached to the rocking frame 81 and is adapted to strike the arm 52 at the end of two-thirds of the downward swing of the rocking frame. This forces the knife $53^b$ into a space in the crown wheel 51 and acts to lock said wheel and its connected type wheel 47 securely in position during the stroke of the hammer.

*Type wheel shifting device.*—Where the type wheel, as illustrated, has more than one row of letters on its periphery it is necessary to shift said wheel in order to bring the letters or numerals of the different rows into position for printing. It is usually customary to arrange the smaller letters in the upper row on the periphery of the type-wheel, as they are the letters most commonly employed, and to arrange the capitals just below the small letters and the numerals, question mark, and other characters, lowermost on the periphery of the wheel. Accordingly I provide the following mechanism for this purpose: On the bracket 53 are arms 118 and between the arms 118 there is a cross brace 119 held in place by the screws 89. Projecting forward from the center of said brace is an arm 44 which forms journal bearings for the vertical shafts 48 and 42. Secured to the shaft 42 near its upper end are collars 45 and 46 which have arms $45^a$ and $46^a$ respectively extending above and below the type wheel 47, and embracing its shaft 48. The upper arm $46^a$ is extended upwardly to form a pointer 68 which coöperates with the space marks on the space bar 17. At the lower end of the shaft 42 where it is journaled in or upon the brace $1^a$ there is a ring 43 with an annular groove therein with which the bifurcated end of the lever 65 engages. The lever 65 extends toward the front of the machine and is forked at its forward end. The bearing block on the brace $1^a$ carries a pivot 66 which passes through the lever 65 and the two branches 67 of said lever extend forward one on each side of the said block. Levers 82 carrying the two outer keys $25^a$ on the lower bank of keys are pivoted as at 68 transversely of the frame, and guides 69 on the frame 1 insure their accurate vertical movement. The arms 67 of the lever 65 extend through openings in the key levers 82 at points between their fulcra 68 and their key ends $25^a$, so that upon depression of either one of the keys $25^a$ the shaft 42 and with it the type wheel 47 is elevated. In order to provide for the shifting of the type wheel to different heights to correspond to the position of the capital letters and that of the numerals thereon, I provide stops $82^a$ on the levers 82, which stops impinge upon the brace $1^a$ and are so disposed that one lever shall have twice the downward movement of the other and the type wheel map thus be elevated to bring into action either the second or third peripheral series of characters, as desired. A collar 39 upon the shaft 42 and a spring 40 concentric with the shaft 42 and interposed between the collar 39 and the bearing arm 44 restores the type wheel to its normal position, when the shift key is released.

*Hammer mechanism.*—Journaled in the downwardly projecting arms $118^a$ of the carriage ends 6 is a bar 10 having attached at each end a curved plate 9, said plates being connected at their upper ends by the rod 12 and at their lower ends by a rod 11. These bars or rods 10, 11 and 12 being parallel and connected by the plates 9 form a hammer frame pivoted on the journals of the rod 10 in the carriage ends, Fig. 25. A hammer 15 is mounted in a guide 14 so as to be in proper alinement with the type wheel 47, so that when the blow is administered it will strike the particular type which is presented by the type wheel for an impression upon the paper, as hereinafter fully set forth. The hammer is provided with a recess whereby it is fitted to rest upon and partially inclose the rod 12, said rod having a sliding movement therein. A spring 16 is fitted in said recess and its free ends impinge upon the rod 12 which forms an elastic cushion for the stroke of the hammer. A hook 62 upon the rocking frame 81 is adjusted to strike the bar 11 after the locking of the wheel 51 and at or near the end of the key depression. This causes the hammer frame to rock on its journals 10 and the hammer 15 sliding in the guide 14 is advanced to strike the band 18 in the rear of the paper and to impress the paper upon the inked ribbon which is interposed between the band 18 and the type wheel 47.

On the lower surface of the bridge 2 are lugs 105 for the reception of a recurved hammer support 104. That portion of said support which is normally in place within the lugs 105 is of rectangular section and adapted to slide in slots to which it is fitted in the lugs 105. The remaining portion of the hammer support is of any approved section, oval or ovate if found satisfactory. A cam 107 upon a screw 106 in the end of the bridge 2 is fitted to bear against the bar 104 and to lock it fast at any desired point. The rod 104 is curved backward and upward from its straight front portion and at its upper extremity is fitted into the socket 13 of the hammer guide 14 by which the hammer is maintained in proper alinement with the type wheel. When the recurved support 104 is drawn out and made fast it permits the passage of the paper backwardly and maintains the proper relation of the impression hammer with the type at all points of the carriage traverse. When said support is pushed inwardly the machine is compact for shipping or carriage.

*Ribbon feed mechanism.*—The bracket 53 is secured to the bridge 2 by the screws 88. It has two arms 85ª curved forwardly and outwardly and which form bearings 90 for the vertical ribbon shafts 38. Upon the upper ends of these shafts are fixed ribbon spools, one on each side of and in alinement with slightly forward of and in alinement with the type wheel 47. These shafts 38 are stepped or journaled at their lower ends in the brace 1ª and mounted thereon are the counterpart ratchet wheels 37. At a convenient point below the bearings 90 of said shafts 38 are the collars 86' and springs 87, said springs being interposed between said collars and bearings to give steadiness against overmotion and form resistance against overwinding.

Mounted between the ratchet wheels 37 and in the same horizontal plane is a bifurcated pawl 36, the stem of which projects rearwardly as at 34 and is pivotally connected at 74 with an arm 33 on the rocking frame 81. A yoke 35 forms a guide for the arm 34 and is bent downward and curved outward to give clearance to the adjacent mechanism until it passes below the brace 1ª where it is pivoted at 78 and extends out through the central front of the frame 1 and is provided with a knob or button 79. Extending from a point in front of the yoke 35 on the arm 34 are two oppositely placed flat springs 103, which are fast upon the arm 34 and bear against the sides of said yoke 35 to give steadiness to the reciprocation of the pawl 36 and keep it in engagement with that ratchet 37 with which it has been thrown into engagement by the shifting knob or button 79.

When the ribbon on one spool has become almost unwound the knob 79 is shifted and as it is connected to the pawl 36 the latter is thereby thrown out of engagement with the opposite ratchet, whereupon the ribbon is then wound upon the other spool.

Upon the bracket 53 to the rear of the arms 85ª are two vertical arms 118 which have their upper ends curved rearwardly to form supports for the two small lower rollers 70 around which the ribbon is passed from one spool to the other in approximate contact with the type wheel 47.

*The paper carriage.*—The carriage 3 is fitted to travel in the guide ways on the bridge 2 and it is provided with counterpart ends 6 in which are journaled the platen 4, and the compression roller 5 in horizontal axial alinement therewith. Back of the rack 64 and below the rollers 4 and 5 is a curved deflector 101 which receives the paper as it passes downwardly between the rolls and deflects it toward the rear of the machine. The carriage has a paper frame pivoted at 7 above the rollers, and said paper frame has two counterpart ends 113 carried by the rods 7, and connected by a curved top plate 112. Journaled in the frame ends 113 is a shaft 8 to which is secured a space indicating bar 17 extending above said shaft and parallel thereto. Below said shaft 8 and connected to the depending bracket 114 is a cushion band 18 of rubber or other elastic material which extends parallel with the shaft 8 and is adapted to form a shield between the hammer 15 and the paper. A knob 94 on the rod 8 outside of the frame ends 113 provides means for grasping the said rod to move the space bar 17 and band 18 so that the paper can be passed down between the space bar and in front of the band and then directly to the space between the rollers 4 and 5. The paper is then deflected by the curved deflector 101 toward the rear of the carriage 3. A slot 5ª permits the roller 5 to move bodily from or toward the roller 4 so as to receive two or more sheets of paper, while springs 4ª preserve contact between the rollers and of the rollers upon the paper, (Figs. 1, 5 and 6.) At the right end of the carriage 3 the journal of the roller 4 is extended and has loosely fitted thereon the lever 95. Beyond the lever there is a knob 97 carrying at its inner end a ratchet 96. Rotatably attached upon a projection of the lever 95 is a pawl 99 normally held out of engagement by a pin 102 in the carriage end 6, but brought into and meshed with the ratchet 96 while the lever 95 is raised by its handle 98. A spring 100 is attached to the pawl 99 and to the plate 6 and tends to hold said pawl 99 in contact with the ratchet 96, whereby the operator can by use of the handle 98 raise the paper between the rollers one or more vertical spaces, and by use of the knob 97 can lower it any desired distance. A detent 115 held in the split pin 116 on the plate 6 impinges upon the ratchet 96 in the rear and prevents slip or lost motion.

*The signal mechanism.*—Within the curve of the hammer support 104 the clip 122 is fastened to the curved rod by means of the screw 125. An arm 134 extends to one side of the clip and upon this arm a gong or bell 121 is secured by a nut 135. A lever 123 is pivoted upon and in alinement with the clip 122 and has at its outer end a hammer with a spring arm held normally out of touch with the gong 121 and at its other end a trip 131 pivoted upon the lever 123. A stop 132 in the clip 122 prevents the lever 123 being moved beyond a fixed distance backward and a spring 133 having its one end upon the top of the trip piece 131 and its other end upon the stop pin 132, returns the lever sharply to its place when tripped and causes the hammer 124 to strike the gong 121.

Upon one of the arms or projections 118<sup>a</sup> of one of the ends 6 of the carriage a guide 137 is fitted having a passage longitudinally therefrom for the reception of a strike bar 126 which is spaced to correspond with the space bar of the carriage and a lug screw 127 serves to make it fast at any desired point. The outer end of the strike bar 126 is bent to form a striker for the trip of the lever 123, and when the carriage is moved toward the gong to the desired degree the bent end of bar 126 strikes the trip 131 and moves the lever 123 upon its pivot until it escapes the strike edge 126, when the spring 133 returns the lever 123 to its position against the stop 132 and causes the hammer 124 to strike the gong 121. In returning the carriage to begin another line of printing the trip 131 turns on its pivot and permits the strike bar 126 to pass.

*Mode of operation.*—The manner of operating the machine is as follows: The operator first turns the space bar 17 forward by means of the knob 94 and inserts the paper downward behind the space bar 17 and in front of the band 18, thence down between the rollers 4 and 5, and when once inserted between said rollers by turning the knob 97 on the roller 4 the paper may be continued to be fed downward until the upper end thereof has been brought to the proper position for the printing of the first line. The deflector 101 acts to deflect the paper in its descent toward the rear of the machine where it does not interfere in any way with any of the parts of the mechanism. As the document to be printed usually begins with a capital letter the operator then strikes the "Cap." key to depress the same, which depresses the lifting lever 65 and through its connections with the type wheel 47 raises said type wheel so as to bring the middle series of characters on the type wheel into alinement with the impression hammer 15, whereupon the operator then strikes the key marked with the desired letter. The corresponding key lever is depressed carrying with it its strike block which enters into its corresponding recess in the toothed bar 59. The curved face of the strike block strikes the upper edge of the tooth of the bar 59, and as said strike block descends it gradually moves the bar 59 to the right or left as the case may be. This engagement of the curved face of the strike block with the toothed bar moves said bar as stated, and through the rack 60 and pinion 61 on the shaft 48 acts to rotate the type wheel 47 sufficiently to bring the letter of the key struck to the printing position or in proper alinement with the hammer. After the curved portion of the strike block of the key lever has passed beyond the upper edge of the tooth of the bar 59 no further movement is imparted to said bar, but the straight portion of the strike block continues to move down into the recess of the bar 59, and this continued movement of the key lever, the toothed bar 59 having brought the type wheel to the proper position for printing, acts to operate the carriage feed and hammer mechanism. Under the further depression of the key the rocking frame 81 descends and the knife edge detent 53<sup>b</sup> is forced into engagement with one of the notches in the crown wheel 51, which securely locks the shaft 48 against further rotation and insures the holding of the letter presented for printing in accurate and rigid position. Simultaneously with the first part of the movement of the key lever the rocking frame 81 is depressed and the toggle link 55 guided over its guide pin 56 drives the pawl 54 forward, so that by the time the straight portion of the strike block on the lever enters the recess in the bar 59 the further descent of the key lever and the corresponding movement of the rocking frame 81 will drive the pawl 54 into engagement with the ratchet wheel 50 and cause the sleeve 49 to rotate one tooth. This imparts a like movement to the gear wheel 63 meshing with the rack 64 on the carriage and moves the rack the space of one tooth prior to the striking of the hammer 15. Just at this point the rocking frame 81 has descended sufficiently to bring the hook 62 into engagement with the rod 11 of the hammer operating frame, whereby said frame is rocked or tilted so as to throw the hammer with a sharp quick blow against the cushion band 18 and directly on the type of the type-wheel presented for printing. In this manner the impression of the type is transferred through the medium of the inked ribbon to the paper.

Immediately upon the printing of the letter the operator withdraws his finger from the key, whereupon the spring 80 throws the key up to its normal position and the spring actuated rocking frame 81 likewise assumes its normal position and in so doing the guide frame 84 moves, one of the arms thereof engaging with one of the inclined faces 84$^a$ of the toothed bar 59, accordingly as the bar has been moved to the right or to the left, whereupon said toothed bar having been released by the key lever is moved laterally to its normal position from which it was moved by the action of said lever. In this manner the said bar 59 is returned by a positive movement and through its rack bar 60 and its connections with the type wheel 47 returns said type wheel to its original position. Furthermore, the upward movement of the rocking frame 81 withdraws the detent 53 from the crown wheel 51 and withdraws the driving pawl 54 so that it is in position with reference to the next tooth of the ratchet wheel to turn said ratchet wheel when it is again advanced by the depression of the next key lever. The return of the rocking frame also acts through the stem 34 of the bifurcated pawl 36 to pull on said pawl so as to rotate one of the ratchet wheels 37 on the ribbon roll shafts, whereby the ribbon is moved slightly and wound around the ribbon drum of the said shaft. The parts having all assumed their normal position the operator then strikes one of the key levers corresponding to one of the small letters on the type wheel, which are normally in horizontal alinement with the hammer, whereupon said type wheel is turned until the corresponding letter is brought to position for printing, when the operations hereinbefore described follow. In like manner when a numeral or other character on the lowermost row is required, the operator will first depress the "Fig." key in order to elevate the type wheel to its fullest extent to bring the numeral or other character in proper position with reference to the hammer. He then depresses the key which carries the desired character, whereupon the parts operate in the same manner as hereinbefore set forth. When it is desired to space without printing, the space bar 24 will be depressed and each such depression causes the downward motion of the rocking frame 81 without in any manner affecting the toothed bar 59 so that the gear wheel 63 is rotated and the carriage is moved to the left one space independently of the regular writing keys.

*Modifications.*—In Figs. 32 and 33 I have shown a modification of the machine in respect to the location of the rear comb or slotted guide bar 58 for the key levers. In this case it is shown as being detached from the swinging frame and is secured to the lugs 105 on the under side of the bridge bar 2 of the stationary frame. In this form it is inverted so that its slots or teeth are on its lower edge. In this position, however, it serves substantially the same functions as when attached to the swinging frame in that it acts in conjunction with the like bar 75 in front of the toothed bar 59 to rigidly brace each key lever against lateral movement at points adjacent to the place of attachment of its strike block 108 and consequently accuracy of movement of the bar 59 is insured.

In Fig. 34 I have shown how the type setting bar 59 can be brought to its central position and held therein positively and accurately by devices supplemental to the spring 128, and those parts interposed between the spring and the bar. Oppositely coiled springs 84$^b$ are fastened at one of their ends to the type setting bar 59 and at their other ends to levers 84$^d$ pivoted to the frame bar 1$^b$. Each lever 84$^d$ has a stop 84$^c$ on the frame and a stop 59$^a$ on the bar 59. If the bar has been moved to the right the left hand spring 84$^b$ will be stretched and when the bar is released from the key lever this spring will cause it to return, the left hand stop 84$^c$ preventing the lever 84$^d$ from swinging to the right. During such movement of the bar 59 the right-hand spring and its lever are idle. If, however, the bar is moved to the left under the action of the key lever the reverse action of that above described takes place.

In Figs. 35 and 36 I have shown a modification of the carriage moving mechanism. Here, instead of a sliding plate 54 there is a swinging lever 54$^d$ pivoted at 54$^e$. This lever at one end is connected to the swinging slotted plate 55 above described and has a dog 54$^a$ adapted to engage successively with the teeth of the wheel 50. At the front end this lever has a pivoted dog 54$^f$, which is adapted to advance the wheel 50 slightly, and at the same time to lock it in position. The dog 54$^f$ is held in normal relation to the lever 54$^d$ by a spring 54$^c$. In this construction when a key is depressed it swings the lever 54$^d$ inward and the dog 54$^a$ engages with a tooth and advances the wheel one step. When the key is released the lever 54$^d$ returns to its normal position and in so doing causes the dog 54$^f$ to impinge on a tooth of the wheel and advance it slightly so that the next time the dog 54$^a$ moves the wheel will be in proper position for advancement. The dog 54$^f$ also serves to hold the wheel 50 in proper position, but can yield to allow the wheel to rotate in either direction.

In the modification shown in Figs. 35 and 36 the sleeve 49 connected with the wheel 50 is not rigidly connected with the rack pinion 63. At the upper end of the sleeve 49 there is a small ratchet 49ᵇ and the pinion 63 has spring pawls 49ᵃ adapted to engage with the ratchet in one direction of rotation. When the parts are constructed in this way the carriage can be advanced step by step by the automatically acting device above described, or can be advanced by hand any desired distance without affecting the position of the sleeve 49 or the wheel 50. When it is to be retracted by hand movement is permitted by the yielding of the dog 54ᶜ.

While I have shown and described in this application the carriage-feed mechanism, the paper-feed mechanism and the ribbon-feed mechanism, I do not herein lay claim to these parts of the machine, *per se*, as they constitute the subject-matter of my co-pending applications Ser. Nos. 282,170—282,046—and 282,045, respectively, which are divisions of this application.

What I claim and desire to secure by Letters Patent is:

1. In a typewriter, the combination with a suitable frame, of a series of key levers, type carrying mechanism, a longitudinally movable bar having notches therein, a series of lugs varying from each other in conformation and secured to said levers respectively, and arranged to engage the edges of said notches, and connections between said bar and said type carrying mechanism for bringing the type in position for printing.

2. In a typewriter, the combination with a suitable frame, of a series of key levers, type carrying mechanism, a longitudinally movable bar having notches of varying widths therein, a series of lugs on said levers respectively arranged to engage the edges of said notches, and connections between said bar and said type carrying mechanism for bringing the type in position for printing.

3. In a typewriter, the combination with a suitable frame, of a series of key levers, type carrying mechanism, a longitudinally movable bar having rectangular notches therein, a series of inclined lugs of widths corresponding with the notches, mounted on the levers respectively and arranged to engage the edges of said notches, and connections between said bar and said type carrying mechanism for bringing the type in position for printing.

4. In a typewriter the combination with a suitable frame, of a series of key levers, type carrying mechanism, a longitudinally movable bar having rectangular notches therein, a series of inclined lugs of corresponding widths, mounted on said levers respectively and arranged to engage the edges of said notches when fully depressed, and connections between said bar and said type carrying mechanism for bringing the type in position for printing.

5. In a typewriter, the combination with a suitable frame, of a series of key levers, type carrying mechanism, a longitudinally movable bar having rectangular notches therein, a series of lugs of corresponding widths on said levers respectively, each inclined for a portion of its length and straight for the remaining portion, said lugs adapted to engage the edges of said notches, and connections between said bar and said type carrying mechanism for bringing the type in position for printing.

6. In a typewriter, the combination with a suitable frame, of a series of key levers, type carrying mechanism, a longitudinally movable bar having rectangular notches therein of varying widths, a series of differentially inclined lugs on said levers respectively and adapted to engage the edges of said notches, and connections between said bar and said type carrying mechanism for bringing the type in position for printing.

7. In a typewriter, the combination with a frame, a type wheel, a pinion driving said type wheel, a type wheel actuating bar with differentially spaced notches, a rack secured to said bar and meshing with said pinion, and levers having differentially sized cam lugs adapted to enter the differentially spaced notches of said bar to move it.

8. In a typewriter, the combination with a suitable frame, of a series of key levers, type carrying mechanism, a longitudinally movable bar having notches formed therein, cam lugs on said levers adapted to enter said notches, the lugs on the right of the longitudinal center being on the right side of their keys and the lugs on the left being on the left hand of their keys, and connections between said bar and said type carrying mechanism for bringing the type in position for printing.

9. In a typewriter, the combination with a suitable frame, of a series of key levers, type carrying mechanism, a paper holder, means independent of the type-carrying mechanism for forcing the paper against the type while the latter is stationary, a longitudinally movable bar operated by said key levers, a rocking frame moved by said levers, means operated by said rocking frame for returning said bar to normal position, and connections between said bar and said type carrying mechanism for bringing the type in position for printing.

10. In a typewriter, the combination with a suitable frame, of a series of key levers, type carrying mechanism, a paper holder and means independent of the type-carrying mechanism for forcing the paper against the type while the latter is stationary, a longitudinally movable bar operated by said key levers, means operated by said levers for returning said bar to normal position, and connections between said bar and said type carrying mechanism for bringing the type in position for printing.

11. In a typewriter, the combination with a suitable frame, of a series of key levers, type carrying mechanism, a paper holder and means independent of the type-carrying mechanism for forcing the paper against the type while the latter is stationary, a longitudinally movable bar operated by said key levers, said bar having a cam face, a guide actuated by said keys and impinging on said cam face, and connections between said bar and said type carrying mechanism for bringing the type in position for printing.

12. In a typewriter, the combination with a suitable frame, of a series of key levers, type carrying mechanism, a paper holder and means independent of the type-carrying mechanism for forcing the paper against the type while the latter is stationary, a longitudinally movable bar operated by said key levers, said bar having angular counterpart faces, a guide positively actuated by the keys impinging on said faces and connections between said bar and said type carrying mechanism for bringing the type in position for printing.

13. In a typewriter, the combination with a suitable frame, of a series of key levers, type carrying mechanism, a paper holder and means independent of the type-carrying mechanism for forcing the paper against the type while the latter is stationary, a longitudinally movable bar operated by said key levers, said bar having a cam-face, and a guide positively actuated by the keys impinging on said cam-face, whereby the bar will be moved longitudinally when a key is depressed and restored to its normal position when the key rises.

14. In a typewriter, the combination with a suitable frame, of a series of key levers, type carrying mechanism, a longitudinally movable bar operated by said key levers, notched guide bars in the front and rear of said bar with which said key levers engage, one of said guide bars being movable, and connections between said bar and said type carrying mechanism for bringing the type in position for printing.

15. In a typewriter, the combination with a suitable frame, of a series of key levers, a paper-carriage, a type carrying wheel which is rotary but held at fixed distance relative to the paper carriage, type wheel setting mechanism, carriage moving mechanism mounted on the axis of the type-wheel, and a series of key levers each adapted to actuate the type wheel setting device and control the carriage moving device.

16. In a typewriter, the combination with a suitable frame, of a series of key levers, a type-carrying wheel operated thereby, a shaft carrying the type wheel, a crown wheel on the said shaft and near the end thereof opposite the type wheel, a rocking frame controlled by the said key levers, and a locking arm in the path of the said rocking frame arranged to engage the said crown wheel, substantially as set forth.

17. In a typewriter, the combination with a suitable frame, of a series of key levers, a substantially vertically disposed shaft whose longitudinal axis is approximately at right angles to the said bars, a type-carrying wheel at the upper end of said shaft, a locking wheel on the said shaft below the key levers, means actuated by the keys for setting the type wheel, and a locking arm arranged to be operated by the key levers and to engage with the said locking wheel, substantially as set forth.

18. In a typewriter, the combination of a frame, a series of keys in the frame, a toothed bar transverse to the keys and actuated longitudinally thereby, a type wheel, a pinion connected to the type wheel and meshing with the rack bar, a lock wheel upon the type wheel shaft, a latch depressed by the keys to lock said wheel, and a hammer independent of the type wheel and actuated by the keys to impress the paper upon the type, as described.

19. In a typewriter, the combination of a frame, a series of keys longitudinally fulcrumed on the frame, a rack bar transverse to the keys and actuated longitudinally thereby, a type wheel rotated by the rack and provided with a lock actuated by the depression of the keys, a sleeve concentric with the type wheel shaft, a pinion, a paper carriage, a rack on the carriage meshing with said pinion, a toothed wheel adapted to be rotated by the stroke of the key, and means for conveying the motion of the key to the toothed wheel, as described.

20. In a typewriter, the combination of a frame, a series of keys on the frame, a rack bar at right angles with the keys and actuated endwise thereby, a type wheel actuated by the rack, a lock wheel connected to the type wheel, a detent for holding the lock wheel, a carriage mounted above and slidable at right angles with the keys, a rack on the carriage, a pinion, a sleeve concentric with the type wheel shaft and carrying said pinion, a toothed wheel upon the sleeve, a driving pawl fitted to reciprocate in guide in the plane of the toothed wheel, a rocking frame below the keys and actuated thereby, and a toggle link connecting said rocking frame and driving pawl, whereby the toothed wheel is rotated by the strokes of the keys.

21. In a typewriter, the combination of a frame, a series of keys fulcrumed thereto, a rack bar slidably supported below and transverse to the keys and actuated differentially thereby, a type-wheel moved by said rack bar, a carriage mounted above the keys, a rack on the carriage, a pinion for the rack, a driving wheel for the pinion, a driving pawl in alinement with said driving wheel, and a means of reciprocating the driving pawl and causing the wheel and the carriage to be moved a fixed distance with each depression of the keys, as shown and described.

22. In a typewriter, the combination with a suitable frame, of type carrying mechanism, a paper carriage, a hammer stationary relatively to the carriage, and a power transmitting device for the hammer secured to and moving with the carriage.

23. In a typewriter, the combination with a suitable frame, of type carrying mechanism, a traveling carriage, a hammer stationary relatively to the carriage, and a swinging frame carried by the carriage and by which said hammer is actuated.

24. In a typewriter, the combination with a suitable frame, of type carrying mechanism, a paper carriage, a hammer stationary relatively to the carriage, a swinging frame on said carriage by which said hammer is actuated, and a sliding connection between said hammer and said swinging frame.

25. In a typewriter, the combination with a suitable frame, of type carrying mechanism, a paper carriage, key levers, a hammer stationary relatively to the carriage, a swinging frame for reciprocating said hammer, and means for operating said swinging frame by the depression of said key levers.

26. In a typewriter, the combination with a suitable frame, of type carrying mechanism, a paper carriage, key levers, a hammer stationary relatively to the carriage, a swinging frame for reciprocating said hammer, a rocking frame controlled by said levers, and connections between said swinging frame and said rocking frame.

27. In a typewriter, the combination with a suitable frame, of a type-wheel, devices for turning the type-wheel, means for actuating said device to set the type-wheel in printing position, means for actuating said devices to return the type-wheel, a rocking frame, carriage moving means, a printing hammer and type-wheel locking mechanism, said carriage moving means, printing hammer, type-wheel returning means, and type-wheel locking mechanism all being actuated by the said rocking frame and the last named mechanism being moved into locking position by said frame.

28. In a type-writer, the combination with a suitable frame, of type-carrying mechanism, an extensible frame, and a hammer on said extensible frame.

29. In a typewriter, the combination with a suitable frame, of type-carrying mechanism, an extensible frame, a hammer on said extensible frame, and means for locking said extensible frame in position with the hammer in proper position with reference to said type-carrying mechanism.

30. In a typewriter, the combination with a suitable frame, of type-carrying mechanism, an extensible frame, a hammer on said extensible frame, and a latch engaging said extensible frame.

31. In a typewriter, the combination with a suitable frame, of type-carrying mechanism, an extensible frame comprising a bar in slidable engagement with said frame with an extended portion bent back to form an arm, and a hammer on said arm.

32. In a typewriter, the combination of a frame, a paper carriage, a type-wheel, devices which rotate and set the type-wheel, a swinging bar, carriage moving means controlled by said bar, a lock for the type-wheel actuated by said bar, a printing hammer independent of the type wheel actuated by the said bar, type-wheel returning devices actuated by said bar, and a series of key levers each adapted to actuate the wheel setting devices and the said swinging bar independently of each other.

33. In a typewriter, the combination of the frame, a paper carriage, a type-wheel, a longitudinally sliding bar for turning and setting the type-wheel, a swinging bar, a series of key levers each adapted to directly actuate the said sliding bar and the said swinging bar, a printing hammer independent of the type wheel, type wheel returning mechanism, type-wheel locking mechanism, and carriage moving mechanism, all controlled by the said swinging bar.

34. In a typewriter, the combination of the frame, a paper carriage, a type-wheel, a longitudinally movable bar for turning and setting the type-wheel, a swinging bar, a series of key-levers each adapted to directly actuate said movable bar and said swinging bar, a printing hammer independent of the type wheel, and type-wheel returning mechanism, both controlled by said swinging bar.

35. In a typewriter, the combination of the frame, a paper carriage, a type-wheel, a longitudinally movable bar for turning and setting the type-wheel, a swinging bar, a series of key-levers each adapted to directly actuate said movable bar and said swinging bar, a printing hammer independent of the type wheel, type-wheel returning mechanism, and type-wheel locking mechanism, all controlled by said swinging bar.

36. In a typewriter, the combination of the frame, a paper carriage, a type-wheel, a longitudinally movable bar for turning and setting the type-wheel, a swinging bar, a series of key-levers each adapted to directly actuate said movable bar and said swinging bar, a printing hammer independent of the type wheel, type-wheel returning mechanism, type-wheel locking mechanism, and ribbon feed mechanism, all controlled by said swinging bar.

37. In a typewriter, the combination of the frame, a paper carriage, a type-wheel, a longitudinally sliding bar for turning and setting the type-wheel, a swinging bar, a series of key levers each adapted to directly actuate the said sliding bar and the said swinging bar, a printing hammer independent of the type wheel, type-wheel returning mechanism, type-wheel locking mechanism, carriage moving mechanism and ribbon feed mechanism, all controlled by said swinging bar.

38. In a typewriter, the combination of the frame, the paper carriage, the type-wheel, the key levers, and the two vertically slotted bars adapted to receive the key levers in their slots, one of said slotted bars being adapted to move bodily endwise for transmitting power to some of the aforesaid parts, and the other being arranged to swing bodily for transmitting power to other parts of the mechanism.

39. In a typewriter, the combination of the frame, the paper carriage, the type-wheel, the hammer, the series of key levers, of two vertically slotted bars adapted to receive the levers in their slots, one of said bars being movable endwise and the other being arranged to swing vertically, one of them for transmitting motion from the keys to the hammer, and the other for transmitting motion from the keys to the type-wheel for setting it.

40. In a typewriter, the combination of the frame, the paper carriage, the type wheel, the means for positively moving the paper carriage, the means for setting the type-wheel, the series of key levers, and the two vertically slotted bars both adapted to receive the key levers in their slots, and to receive movement therefrom, one of said bars being movable endwise and the other arranged to swing bodily, and one being connected to and actuating the type-wheel setting device, and the other being connected to and actuating the carriage moving device.

41. In a typewriter, the combination of the frame, the paper carriage, the type wheel, the support for the ribbon, means for positively moving the carriage, means for positively moving the ribbon, means for setting the type-wheel, means for locking the type-wheel, a hammer, means for turning the type-wheel, a movable bar actuated by the key levers and transmitting motion to the type-wheel restoring device, to the carriage moving mechanism, to the hammer, to the ribbon moving mechanism, and to the type-wheel locking mechanism.

42. In a typewriter, the combination of the frame, the paper carriage, the type-wheel, the printing hammer, the series of vertically vibrating key levers, the slotted bar engaging the key levers and movable bodily endwise transverse to the levers, the vertically slotted bar secured to the frame and receiving the key levers in its slots, and the vertically slotted bodily swinging bar receiving the key levers in its slots and means connecting the longitudinally moving and the vertically swinging slotted bars to the parts actuated thereby respectively.

43. In a typewriter, the combination of the supporting frame, the type-wheel, the paper carriage, the printing hammer, the key levers, the swinging frame pivoted to the supporting frame and disposed for engagement with the key levers, and means operably associated with the swinging frame for locking the type wheel in printing position, for actuating the printing hammer, for returning the type wheel to normal position and for actuating the carriage, respectively.

44. In a typewriter, the combination of a frame, keys, a longitudinally movable rack bar operated by said keys, a type-wheel rotatable on a fixed axis by said rack bar, a vertically slotted crown wheel on the type-wheel axis, a spring supported detent adapted to engage the crown wheel when the key has partially completed its stroke, a hammer, a rocking frame, and a hook upon the rocking frame engaging with the hammer immediately on the depression of said detent.

45. In a typewriter, the combination of a frame, a series of spring supported keys fulcrumed longitudinally of the frame, a series of differentially curved strike blocks on the keys, a rack bar transverse the frame below the keys having differentially placed rectangular recesses registering with said strike blocks, a spring supported rocking frame below and in the rear of the keys, a vertically slotted guide bar in front of the rack bar and extending above the keys, a carriage supported above the keys and movable transversely thereto, a type-wheel rotatable by the depression of the keys, a lock-wheel brought to rest by the continued depression of the keys after the endwise motion of the rack is completed, and a hammer actuated by the completion of said key depression.

46. In a typewriter, the combination of a frame, a series of spring supported equilever keys on the frame, a rack bar transverse the keys and differentially actuated longitudinally thereby, a type-wheel shaft having a pinion meshing with the rack bar, a lock wheel, a detent therefor, a type-wheel connected in fixed axial relation with and capable of being moved longitudinally on said shaft, a sleeve concentric with the type-wheel shaft, a pinion on said sleeve, a paper carriage, a rack upon the carriage with which the sleeve pinion meshes, a driving wheel upon the sleeve, a key actuated driving pawl actuating said wheel, an inked ribbon between the type-wheel and carriage, and a hammer driven into contact with the paper on the carriage at the conclusion of the key stroke.

47. In a typewriter, the combination of the main frame, the carriage, a rocking frame having a rod extending lengthwise of the carriage and journaled thereon, a rocking frame mounted on the main frame below the keys and depressed thereby, a link connecting the hammer frame with the rocking frame, a recurved supporting bar, a hammer guide thereon, a hammer mounted in said guide and maintained in fixed radial relation with the type-wheel, independently of the carriage movement, said hammer having a recess fitting said rod of the hammer frame and being adapted to be thrown against the type-wheel by the depression of the keys.

48. In a typewriter, the combination of the frame, the key levers, the paper carriage, the carriage moving mechanism, the spring supported rocking frame engaged and adapted to be depressed by the key levers, operating mechanism between the carriage moving mechanism and the rocking frame, an arm on said rocking frame independent of said operating mechanism, the ribbon spool, the ratchet connected to the ribbon spool, and the pawl rod for said ratchet connected with said arm.

49. In a typewriter, the combination of the key levers, a spring supported rocking frame in normal engagement with and actuated by the key levers, a type wheel actuated from the said rocking frame, a locking wheel for the type-wheel, a spring supported knife edge detent lever for the lock wheel mounted on a fixed pivot and normally out of engagement, and an arm on the rocking frame, adjusted to drive said detent into engagement with said locking wheel after the type-wheel-actuating portion of the key stroke has been accomplished.

50. In a typewriter, the combination of the frame, a movable paper carriage, a series of keys, a rocking member actuated by the keys, a toggle link pivoted on said rocking member, a pawl actuated mechanism actuated by said toggle link for moving the carriage, a type-wheel, a lock wheel for the type wheel, a detent for the lock wheel, a striking bar for the detent connected to the rocking member, a printing hammer, and a hook connected to the rocking member, for actuating the hammer.

51. In a typewriter, the combination of the type wheel, the ribbon, the paper carriage behind the type wheel, a graduated spacing scale bar on said carriage above the ribbon, a frame for vertically shifting the type wheel, and an indexing device or pointer carried by said frame and extending toward the spacing scale to register with the graduations thereon.

52. In a typewriter, the combination of the type-wheel, a type-wheel shaft, a supplemental vertical shaft, plates or bars extending laterally from said shaft and supporting the type-wheel on its independent shaft, a clutch on the supplemental shaft, a lever pivoted to the frame and engaging the clutch, key levers engaging the end of the clutch lever, and differential stops on said key levers whereby one causes the elevating of the vertical shaft and of the type-wheel a greater distance than the other.

53. In a typewriter, the combination of the main frame, the type carrying devices, the traveling carriage, the hammer, the supporting rod for the hammer secured to the frame and extending outward therefrom and recurved and extended to a point adjacent to the type carrier, said hammer supporting rod being adjustably fitted in slotted lugs on the frame, a hammer guide on said rod, and the cam like locking devices on the frame for locking the rod in place.

54. In a typewriter, the combination of the frame, the paper carriage, the type carrying devices, the hammer, the hammer support mounted on the frame and extending outward to one side thereof and then curved upward and backward to points adjacent to the type carrier, a bell mounted within the curve of the said hammer support, means for striking the bell, and a bar on the carriage for moving the bell striking means.

In testimony whereof I affix my signature in presence of two witnesses.

WILLIAM A. McCOOL.

Witnesses:
JOHN W. CULMER,
EDW. T. FESSENDEN.